United States Patent [19]

Kitaichi et al.

[11] Patent Number: 5,569,474
[45] Date of Patent: Oct. 29, 1996

[54] MOLD FOR INJECTION MOLDING OF PLASTICS USING THIN FILM ELECTRIC HEATER

[75] Inventors: Satoshi Kitaichi; Chiaki Nakamura; Michio Tanaka; Atushi Fukuta, all of Moriguchi, Japan

[73] Assignee: Daiho Industrial Co., Ltd., Osaka, Japan

[21] Appl. No.: 462,790

[22] Filed: Jun. 5, 1995

[30] Foreign Application Priority Data

Jun. 6, 1994 [JP] Japan ........................... 6-148630
Mar. 16, 1995 [JP] Japan ........................... 7-86501

[51] Int. Cl.$^6$ ........................................... B29C 45/73
[52] U.S. Cl. .............. 425/547; 219/541; 219/543; 249/78; 264/319; 264/328.160; 425/DIG. 110
[58] Field of Search .................. 425/547, DIG. 110; 249/78, 79; 264/328.16, 319; 219/543, 541, 243

[56] References Cited

U.S. PATENT DOCUMENTS

| | | | |
|---|---|---|---|
| 1,150,428 | 8/1915 | Hadaway | 219/541 |
| 2,907,070 | 10/1959 | Hartesveldt | 425/DIG. 110 |
| 2,961,522 | 11/1960 | Hammer | 219/541 |
| 3,597,591 | 8/1971 | Van Derlip | 219/541 |
| 4,401,885 | 8/1983 | Ishii et al. | 219/541 |
| 4,536,645 | 8/1985 | Mio et al. | 219/543 |
| 5,155,340 | 10/1992 | Morita et al. | 219/543 |
| 5,408,844 | 4/1995 | Stokes | 249/79 |

FOREIGN PATENT DOCUMENTS 49-53953 5/1974 Japan .
55-067417 5/1980 Japan .

*Primary Examiner*—Jay H. Woo
*Assistant Examiner*—Joseph Leyson
*Attorney, Agent, or Firm*—Wenderoth, Lind & Ponack

[57] ABSTRACT

A mold includes a thin film electric heating employing voltage and current suppressed below values of an allowable voltage and an allowable current. The thin film electric heat includes a thin film electric resistor formed directly on a surface of the mold and is energized to effect heating. The resistor has a surface resistivity r, expressed by $r=\rho/t$ (where $\rho$ is the volume resistivity of the thin film electric resistor and t is the film thickness of the thin film electric resistor), within a range to achieve the heating function of the thin film electric heater while the values of voltage and current applied to the thin film electric heater are suppressed below the values of the allowable voltage and the allowable current.

5 Claims, 13 Drawing Sheets

MOLD FOR INJECTION MOLDING OF PLASTICS USING THIN FILM ELECTRIC HEATER

FIELD OF THE INVENTION

The present invention relates to a mold for injection molding of plastics using the thin film electric heater.

BACKGROUND OF THE INVENTION

For heating a surface of an object, there has been proposed a method in which bar-type electric heaters 25 are fixed in proximity to the object surface as shown in FIG. 9. In this method, however, the heating sources are separated so that the surface temperature will be non-uniform. Further, the bar-type electric heaters 25, which are the heating sources, are apart from the surface of a base plate 21, so that the temperature response on the surface is delayed from that at the heating sources because of the existence of the time for heat transfer from the heating sources to the surface. As a further problem, the heat capacity of the base plate 21 is so large that the temperature of the base plate surface will not fall rapidly after the electric current is switched off.

FIG. 10 illustrates another method by which flat-type electric heaters 26 with nichrome wires housed in a flat-type metal container are fitted to a base plate 21 to achieve the same purpose as the method mentioned above. By this method, although non-uniformities of the surface temperature can be reduced to a smaller extent than by the aforementioned method, the delay of the heating time and cooling time cannot be avoided, also because of the large heat capacity of the base plate 21.

To improve these and other drawbacks, there has been proposed a method, as shown in FIG. 11, in which a thin film electric resistor (thin film electric heater) 10 is formed on a surface of an electrically insulating object 21 and the object surface is heated by electric current supplied to the thin film electric heater 10 through a conductor wire 14 and terminals 13, 18. This type of proposal is made by, for example, JP-A 49-53953 and JP-A 55-67417. However, even with the use of these proposals, effective heating action cannot actually be attained without satisfying further requirements for the value of input power, the value of electric resistance, and the like. Nevertheless, the aforementioned prior art arrangements include no specific requirements with regard to these factors.

Particularly, in order to get a rapid heating of the object surface, more restrictive requirements are needed. However, the above prior art arrangements do not describe at all such restrictive requirements.

The method of heating by using a thin film electric heater formed directly on a surface of an electrically insulating object is an effective method for heating the surface of the object, particularly for heating a surface of an object rapidly. However, satisfactory heating effects cannot be obtained only by forming a thin film electric heater directly on the object surface. Other requirements must be satisfied, to achieve rapid heating.

It is a first requirement for heating an object surface that the quantity of heat supplied to the object surface should be greater than that dissipated from the object surface. Namely, the first requirement is that the quantity of heat produced by the thin film electric heater formed on the surface should be larger than that dissipated from the object surface per unit time.

Next, in order to satisfy the first requirement, limitations on voltage and current must be observed due to the capacity of the power source and safety. When the operating voltage is limited to be low, in order to meet the first requirement, the large required current should be obtained by using a lower resistance value of thin film electric heater. But, in some cases, such a large electric current may exceed the allowable current. Conversely, under the limitation of low operating current, the supplied voltage should be high enough to meet the first requirement by using a higher resistance value of the thin film electric heater. But, in some cases, such a high voltage may exceed the allowable voltage. Accordingly, in addition to meet the first requirement, the values of the voltage and the current must be in allowable ranges by using a adequate resistance value. This is a second requirement.

Generally, the resistance value of the thin film electric heater depends on the intrinsic volume resistivity of the material used and the dimensions of the thin film electric heater. In order to meet the first and second requirements, these are some cases where a thin film electric heater with a thickness under 1 μm has to be used, depending on the intrinsic volume resistivity of the material, which may result in poor working reliability. In other converse cases where a thin film electric heater with a large thickness must be used due to the intrinsic volume resistivity of the material, such excessive large thickness is not practical. As a consequence, proper material selection and optimum design for the thin film electric heater are required. This is a third requirement.

However, there have been no thin film electric heaters, so far, that satisfy such three requirements.

The process of injection molding of plastics includes injecting, cooling, and solidifying molten plastics in a mold which has a cavity whose geometrical shape is identical with that of a desired product.

This injection molding is conducted by apparently simple processes, but there are various problems in actual practice. For example, there may occur problems of "weld-mark", "silver streak" and "sink mark" upon the appearance of products. Herein, the term "weld-mark" refers to a phenomenon that streaky flaws appear on the product surface, and this phenomenon often occurs around openings of the product. The structures at the opening portions of a mold hinder the filling of plastics. When the flow front of molten plastics flowing within the cavity reaches the opening portions, the flow of the molten plastics is branched around the opening portions and meets again to flow together. During a quite short time interval from branching to meeting, the surface of the plastics comes into contact with the mold wall surface and air, thereby being cooled, so that an extremely thin frozen layer is formed. As a result, at the time when the branched flows meet via the frozen layer, such a frozen layer is apparent as a streaky flaw. The term "silver streak" refers to surface defects appearing as if the surface were scratched by a brush. This phenomenon occurs because moisture contained in the plastics vaporizes into steam and, in some cases, the plastics itself decomposes to generate gases, so that minute foams due to these gases gather and appear on the product surface. Furthermore, the term "sink mark" refers to surface defects due to small depressions on the product surface. This phenomenon occurs, in many cases, at places where the wall thickness of the product changes abruptly.

In actual injection molding operations, various efforts such as adjustment of the temperature of molten plastics, injection pressure, injection speed, or modification of the mold structures have been attempted to reduce such defects. However, in fact, it is quite difficult to eliminate such defects completely.

As an effective method for eliminating such defects, there is conventionally known a method in which the mold is heated. By heating the mold, since the growth of the frozen layer on the surface of fluidized plastics can be suppressed, the branched flows of plastics will meet without traces. As a result, the "weld-mark" defect can be eliminated. Further, a higher mold temperature will lower the viscosity of the plastics low. Thus, even if any foam exists it will be crushed by the injection pressure, so that "silver streak" defect also will be eliminated. However, it has not necessarily been possible to improve the "sink mark" defect by increasing the mold temperature. Still, the aforementioned method has been advantageous for improvement of the "weld-mark" and "silver streak" problems.

As described above, it has been found that plastics injection is improved by heating the mold. However, heating of the mold prolongs the molding time, which in turn results in higher cost of the injection molding operation.

As typical conventional methods of heating the mold surface, electric heaters, for example, as shown in FIGS. 9 and 10, are incorporated into the mold to perform heating. By this method, it takes a long time to heat the mold to a predetermined temperature, and further to cool the plastics injected into the mold. The quantity of heat for raising the temperature of the wall surface of the mold is only a small portion of the entire quantity of heat generated by the electric heaters, because the generated heat diffuses into the whole mold. Accordingly, a long time is required to raise the temperature of the wall surface of the mold. Conversely, it is required to remove the entire quantity of heat accumulated in the whole mold in order to cool the wall surface. This causes the problem that longer cooling time also is needed.

This fact is incompatible with the demand of molding manufactures that the molding time be reduced as much as possible. Therefore, these conventional methods of using electric heaters to raise the mold temperature are not acceptable for practical use.

In another proposed method, instead of using the electric heater, the mold may be heated by flowing high temperature fluid through cooling channels originally incorporated for cooling the mold. However, the disadvantages are the same as for the foregoing method.

Further proposed is a method in which only the mold surface is heated with high-frequency current. Since the high-frequency current will flow only through the surface of conductors, this method is suitable for the heating of the mold surface alone. Therefore, this method has an advantage that the time needed for heating is shortened. However, in order to generate a high-frequency current on the mold surface, it is necessary to place a high-frequency coil opposed to the mold surface to be heated. Therefore, during the time when movable and stationary molds are kept open for ejecting the molded product, the high-frequency coil is between the molds. This would result in a prolongation of the overall molding time. Yet, after the mold surface is heated to a predetermined temperature with a high-frequency current, the temperature would fall during the time of moving the high-frequency coil out of the molds.

As mentioned above, the conventional methods of heating the mold have the disadvantage of prolonging molding time.

The present invention is therefore intended to provide a thin film electric heater which makes it possible to heat only the surface of an object rapidly, and to provide a method and apparatus or mold for plastics molding which use the thin film electric heater in a mold for injection molding, so that the prolongation of molding time is reduced to minimum, and that the defects such as "weld-mark", "silver streak" and "sink mark" rarely occur.

SUMMARY OF THE INVENTION

To achieve the above objectives, a thin film electric heater employed in a mold according to the present invention comprises a thin film electric resistor which is formed directly on a surface of an object to be heated, e.g. a mold member. Surface resistivity r can be given by the following equation:

$$\frac{W_r}{\left(\frac{I_a}{D}\right)^2} \leq r \leq \frac{1}{W_r} \left(\frac{V_a}{L}\right)^2 \quad (1)$$

where r is surface resistivity, L is a length between terminals for supplying electric power to the thin film electric resistor as measured along the thin film electric resistor, D is a length of the thin film electric resistor in a direction perpendicular to the direction between the terminals, $V_a$ is a maximum value of allowable voltage applied between the terminals, $I_a$ is a maximum value of allowable current flowing between the terminals, and $W_r$ is an input power per unit area of the thin film electric resistor required to obtain a rate of temperature rise of a mold wall surface.

Preferably, the volume resistivity $\rho$ of the thin film electric resistor is within a range of $10 \times 10^{-8}$ to $200 \times 10^{-8}$ $\Omega \cdot m$.

Also preferably, whereas the surface resistivity r of the thin film electric resistor needs to fall within the range given by Equation (1), the surface resistivity r is more desirably within a range of 0.05 to 1.0 $\Omega/\square$.

Further in one preferred embodiment of the present invention, the input power per unit area of the thin film electric resistor is set to 10–60 W/cm² when the object is a high thermal conductivity material with thermal conductivity above 10 W/m·K, while the input power per unit area of the thin film electric resistor is set to 1–15 W/cm² when the object is a low thermal conductivity material with thermal conductivity below 10 W/m·K.

According to the present invention constructed as described above, a thin film electric resistor is formed directly on the surface of the object, and the surface resistivity r of the thin film electric resistor is within the range given by Equation (1). Thus, it is possible to generate the necessary input power per unit area $W_r$ while keeping the values of voltage and current to be applied to the thin film electric resistor below the allowable voltage $V_a$ and the allowable current $I_a$.

Also, it is possible to rapidly increase the temperature of the object surface, by setting the input power per unit area of the thin film electric resistor to 10–60 W/cm² when the object is a high thermal conductivity material with thermal conductivity above 10 W/m·K, and by setting the input power per unit area of the thin film electric resistor to 1–15 W/cm² when the object is a low thermal conductivity material with thermal conductivity below 10 W/m·K.

Further, according to the present invention, the thin film electric resistor of the present invention is formed on at least part of the wall surfaces of the cavity in a mold for plastics injection molding. Molten plastics is injected into the cavity with the thin film electric resistor energized, and then the molded product in the cavity is ejected from the mold with the thin film electric resistor de-energized.

In yet another embodiment, the thin film electric heater is formed on at least part of the wall surface of the cavity of the mold, wherein the thin film electric resistor is energized while stationary and movable molds or mold members are kept open, and is de-energized before the stationary and movable molds are closed. Molten plastics then is injected into the cavity of the closed molds after solidification of the molten plastics, and the molded product is ejected from the mold.

As mentioned above, the thin film electric resistors, which are the heat source, are provided on the wall surface of the mold into which the molten plastics is injected. Therefore, direct heat exchange between the heat source and the molten plastics more effectively controls temperature of the plastics. Moreover, since the value of the input power fed to the thin film electric resistors and the values of surface resistivity and volume resistivity of the thin film electric resistor are selectively set to those as described above, it becomes possible to increase the rate of temperature rise and the rate of temperature fall of the wall surface of the mold. As a result, it becomes possible to heat the wall surface of the mold while reducing prolongation of the molding time to a minimum. Therefore, the "silver streak", "weld-mark" and "sink mark" defects are suppressed from being generated in the molded product, and reproducibility from the mold to the molded product is improved.

DETAILED DESCRIPTION OF THE PREFERRED EMBODIMENTS

Figure 1:
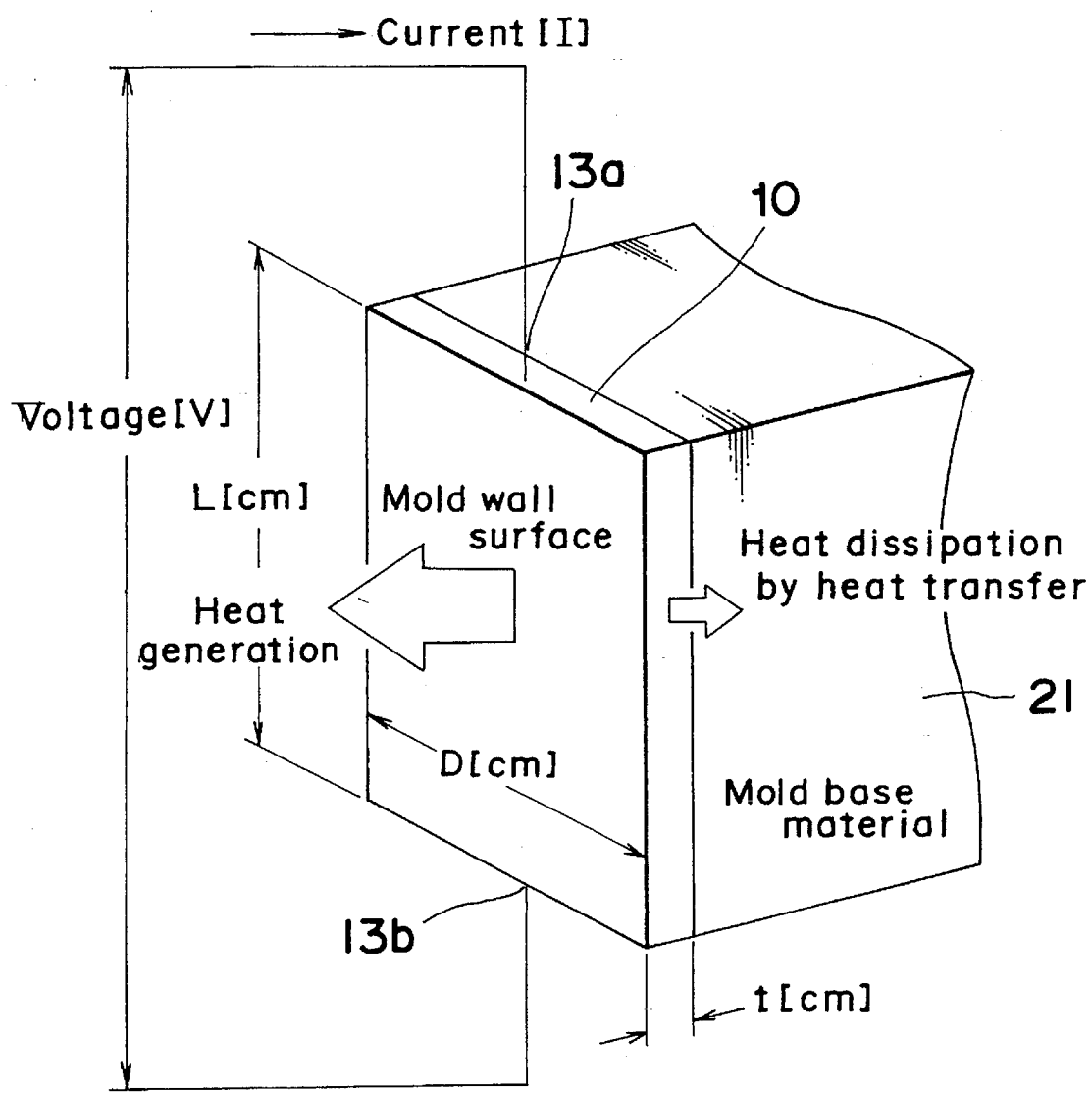
FIG. 1 is a schematic view of a thin film electric heater employed according to the present invention.
Figure 11:
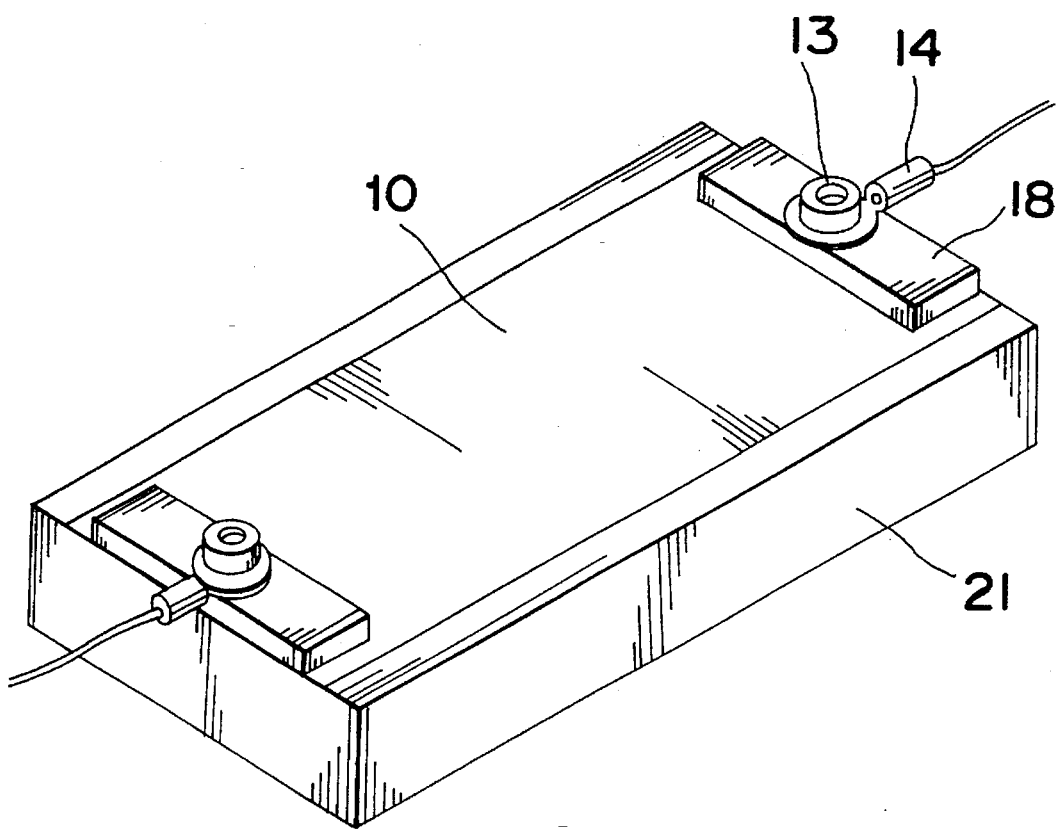
FIG. 11 is a perspective view showing a conventional electric heater in which a thin film electric resistor is formed directly on the surface of an object to be heated.

FIG. 1 is a view schematically showing a thin film electric heater according to the present invention, in which a thin film electric resistor is formed directly on the surface of an object. The thin film electric heater is identical in fundamental construction with that shown in FIG. 11.

A thin film electric resistor 10 is formed on a surface of a base plate 21 to be heated. Although the base plate 21 may be made of an electrically insulating material or a conductive material, the base plate 21 is previously provided with an electrically insulating layer formed on its surface if it is made of the conductive material. Terminals 13a, 13b are connected to a power source through a conducting wire. This device is designed to heat the surface of the base plate 21 by energizing the thin film electric resistor 10, but only constructing the heater in this way makes heating impossible as described above.

Assume that a current I flows with a voltage V applied to the thin film electric resistor 10, as shown in FIG. 1. The distance of the thin film electric resistor along the surface of the base plate 21 from the terminal 13a to the terminal 13b is denoted by L [cm], and another distance of the thin film electric resistor along a direction perpendicular to the direction of the distance L along the surface of the base plate 21 is denoted by D [cm]. Here, the expression "distance along the surface" means the length measured along the geometrical contour of the surface of the base plate 21.

Then, the rate of temperature rise or increase $V_T$ of the thin film electric resistor can be expressed by the following equation:

$$V_T = \text{(generated quantity of heat–dissipated quantity of heat)/heat capacity} \quad (2)$$

From this equation, in order to increase the temperature rise rate $V_T$ of the thin film electric resistor 10, the following two conditions are required:

Condition 1: Input power should be larger than the dissipated quantity of heat due to heat conduction and heat convection from the surface of the object to be heated; and Condition 2: Heat capacity of the thin film electric resistor should be small.

Condition 1 means that the quantity of heat dissipated from the object to be heated is one of the factors that determine the temperature rise rate. The quantity of heat dissipated from the thin film electric resistor depends not only on the thermal conductivity of the base plate but also on the heat convection between the surface of the object and the surrounding air. Therefore, the input power to the thin film electric resistor to obtain a certain temperature rise rate differs depending on the thermal conductivity of the material as well as the boundary conditions.

Figure 2:
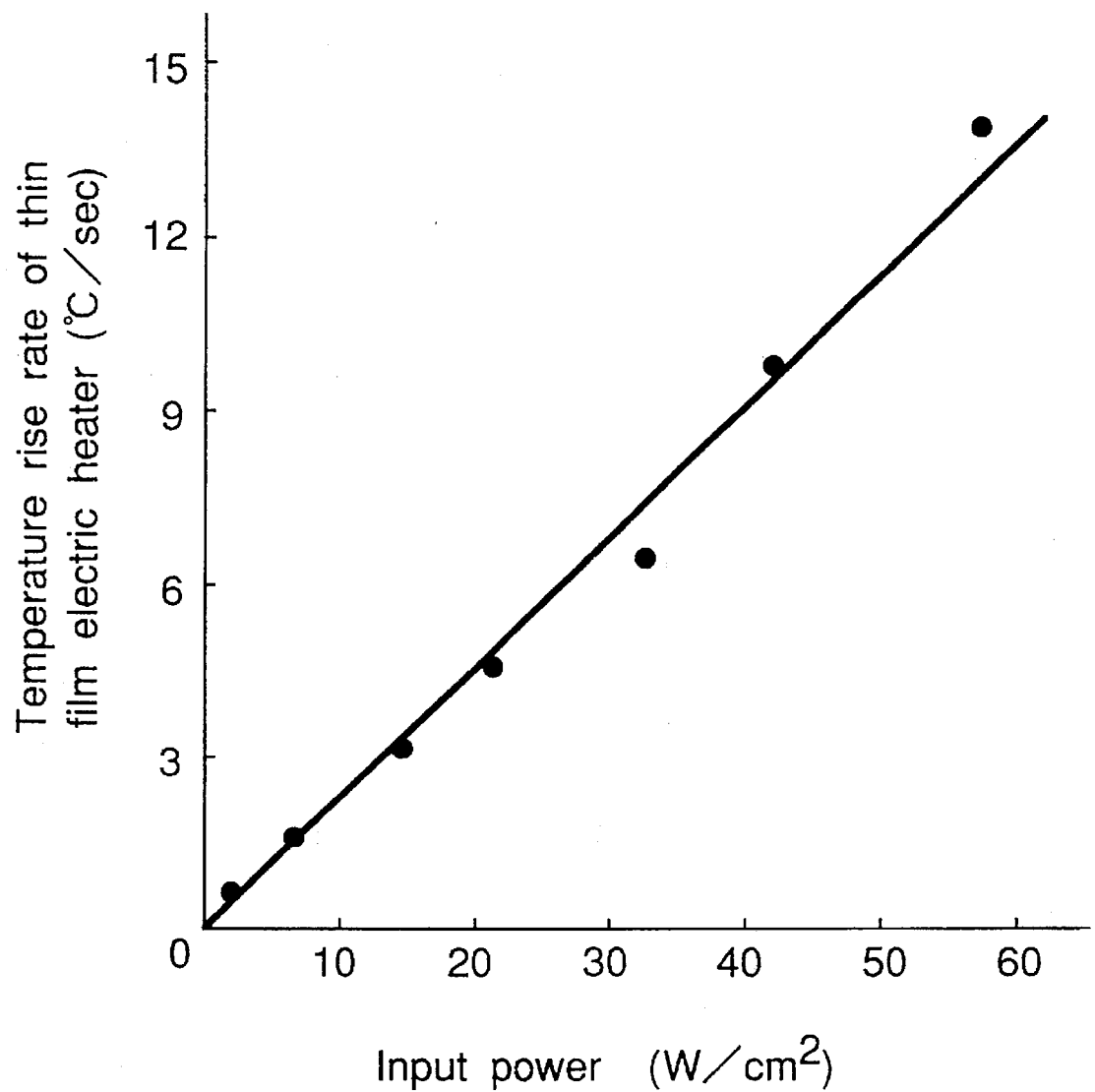
FIG. 2 is a chart showing the relationship between the input power and the rate of temperature rise of the electric heater with the use of the thin film electric heater according to the present invention.

The required input power necessary for a certain temperature rise rate was determined through the following experimental model. In this experimental model, which is similar to the thin film electric heater shown in FIG. 1, AlN was used as the material of mold base 21, and TiN was used for the material of the thin film electric resistor. FIG. 2 shows results of the experiment. From FIG. 2, for example, it is known that an input power of approximately 10 W/cm$^2$ is required to attain a temperature rise rate of 2° C./sec. Further, the input power needs to be increased for higher temperature rise rates, thus it is also shown that an input power of 40 to 42 W/cm$^2$ is required to attain a temperature rise rate of 10° C./sec. Hereinafter, the input power per unit area required to obtain a desired temperature rise rate is referred to as "unit area power requirement" and represented by $W_r$.

The thermal conductivity of the ceramic used in this experiment is approximately 100 W/m·K, which is about double the thermal conductivity of steel (50 W/m·K).

In the above experiment, materials were classified into high thermal conductivity materials with thermal conductivity above 10 W/m·K and low thermal conductivity materials with thermal conductivity below 10 W/m·K. As described above, it has been found that a unit area power requirement of 10–60 W/cm$^2$ is needed for rapid temperature rise with the use of a ceramic of high thermal conductivity material (e.g., AlN). In contrast to this, another experiment performed upon a ceramic of low thermal conductivity material (e.g., a material made mainly of zirconia), shows that a unit area power requirement of 1–15 W/cm$^2$ is enough for rapid temperature rise with such material.

With the use of a ceramic of high thermal conductivity material and an input power over 60 W/cm$^2$, the ceramic was cracked and moreover fractured due to too rapid temperature rise. Similarly, with the use of a ceramic of low thermal conductivity material, and an input power over 15 W/cm$^2$, the ceramic was cracked and moreover fractured due to too rapid temperature rise.

Figure 3:
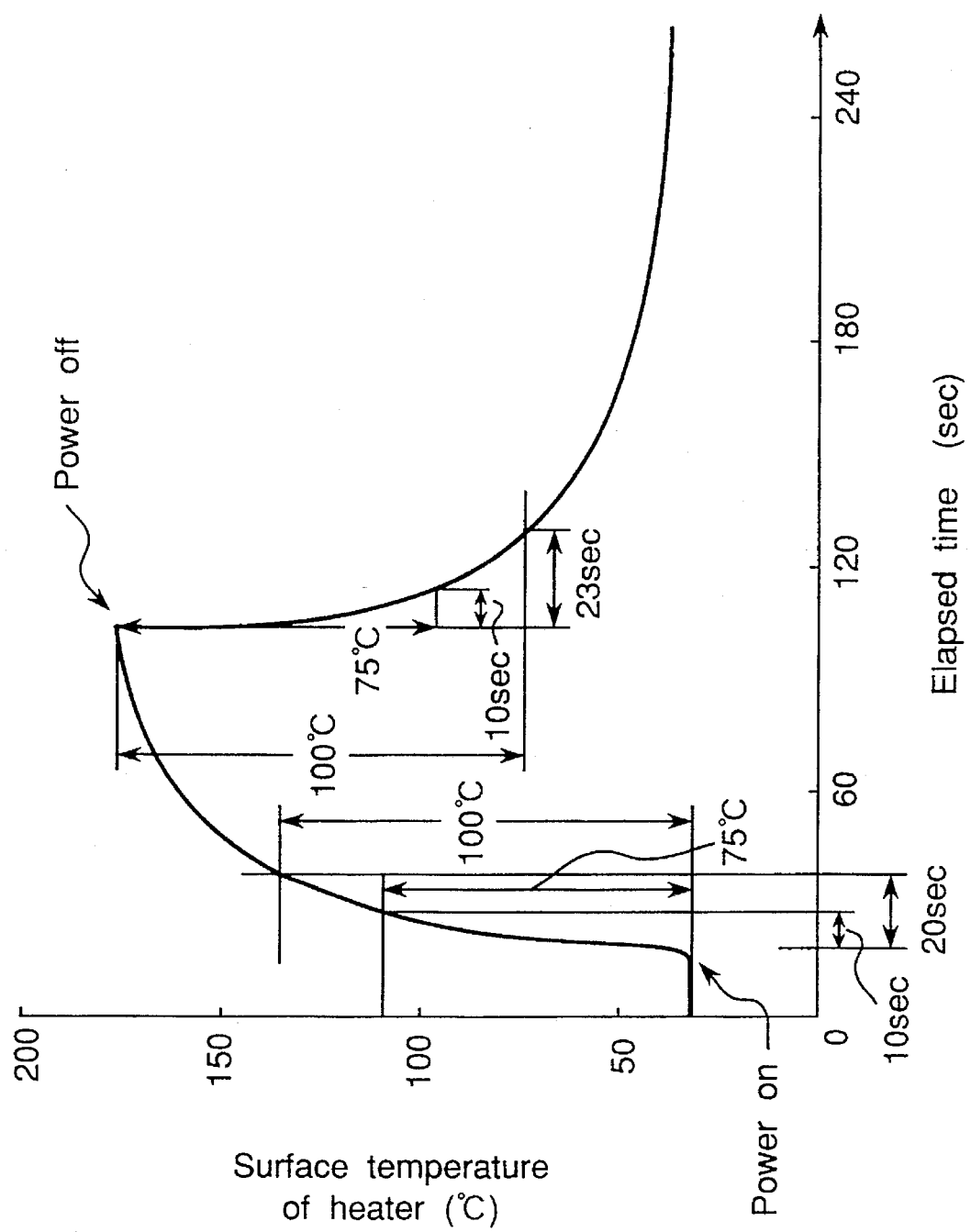
FIG. 3 is a chart showing the relationship between the heating elapsed time and the temperature rise of the electric heater when the object to be heated by the electric heater according to the present invention has a high-thermal conductivity.

Further, to satisfy Condition 2, it is preferable that the thin film electric resistor has a small film thickness. FIG. 3 shows results of measurement of the surface temperature of the electric heater which, as a thin film electric resistor, is composed of a TiN film with a thickness of 2 μm.

Next the electric resistance value of the thin film electric resistor is discussed. Since electric power required for heating the object surface is the product of the area of the surface of the heated object and the unit area power requirement, the larger is the area of the object surface then of course, the larger is the value of the supplied power required for heating the object surface. As a result, the value of voltage or current applied to the thin film electric resistor also becomes larger. The voltage applied to the thin film electric resistor is limited for safety reasons. The maximum value of voltage that can be applied is represented by $V_a$. The current value also is limited in terms of controllability and handling simplicity, and the maximum value of current that can be used is represented by $I_a$.

When a voltage is applied to the thin film electric resistor with surface resistivity r, both the applied voltage value and resulting current value should be within the allowable voltage $V_a$ and allowable current $I_a$, and the input power per unit area must be larger than the unit area power requirement $W_r$. By consideration of these conditions, it can be concluded that the surface resistivity r of the thin film electric resistor needs to be a value that falls within the range expressed by Equation (1).

For example, if the dimensions of the thin film electric resistor are L=17 cm, D=8 cm and if allowable voltage $V_a$=50 V, allowable current $I_a$=100 A, and $W_r$=20 W/cm$^2$, then the surface resistivity r needs to be within a range of r=0.13 to 0.43 Ω/□.

As another example, if the dimensions of the thin film electric resistor are L=15 cm, D=7 cm and if allowable voltage $V_a$=50 V, allowable current $I_a$=100 A, and $W_r$=30 W/cm$^2$, then the surface resistivity r must be within a range of r=0.15 to 0.37 Ω/□.

As yet another example, if the dimensions of the thin film electric resistor are L=30 cm, D=30 cm and if allowable voltage $V_a$=40 V, allowable current $I_a$=1000 A, and $W_r$=40 W/cm$^2$, then the surface resistivity r of the thin film electric resistor must be within a range of r=0.036 to 0.044 Ω/□.

Meanwhile, if the surface resistivity of the thin film electric resistor is represented by r, then the surface resistivity r can be expressed as ρ/t (where ρ is the volume resistivity of the thin film electric resistor and t is the film thickness of the thin film electric resistor).

If the range of the value of surface resistivity r is obtained by Equation (1), and if the material of the thin film electric resistor is determined, then the film thickness of the thin film electric resistor is determined from the above relation, r=ρ/t. Too small a film thickness would cause the film to be broken with a slight shock, that is, would result in poor reliability of the film. In the case of copper, for instance, since ρ=2×10$^{-8}$ Ω·m, the film thickness needs to be t=0.1 μm in order to obtain a value of r=0.2 Ω/□. This is not practical because the film will be easily broken.

Conversely, if the film thickness is too large, it becomes difficult to form the film and cracks easily occur due to thermal stress and the like. Moreover, since the dimensions of the object to be heated are influenced only by the change of the size of the film thickness, a large film thickness is undesirable also in terms of fabrication of the object to be heated.

TiN used in the present embodiment as the material of the film can be ordinarily formed by processes of ion plating, sputtering, CVD (Chemical Vapor Deposition) or the like, where the value of volume resistivity ρ of the TiN film formed can be largely changed depending on the conditions under which the film is formed.

As a result of studies on various aspects such as the strength of the thin film electric resistor and problems in the fabrication of the object to be heated, it has been found that the volume resistivity of the thin film electric resistor is preferably within a range of 10×10$^{-8}$ to 200×10$^{-8}$ Ω·m.

As described above, although the resulting value of surface resistivity r of the thin film electric resistor varies depending on characteristics of the film material used, it is preferable that r is 0.05 to 1.0 Ω/□ when a TiN film is used.

In the case that TiN is used for forming the thin film electric resistor, although the volume resistivity of TiN varies depending on process conditions, values near 100× 10$^{-8}$ Ω·m were most frequently obtainable. If the volume resistivity ρ, and surface resistivity r of TiN film are 100× 10$^{-8}$ Ω·m and r=0.5 Ω/□, respectively, the obtained film thickness t is 2 μm. As described above, the film with thickness t=2 μm not only complies with Condition 2 advantageously, but also has enough strength to prevent the breakage of the film, and, therefore, can be used practically.

In addition to TiN, one of the materials such as TiC, TiCN, TiAlN and CrN may be used to form the thin film electric resistor, or a plurality of these materials may be laminated.

Figure 4:
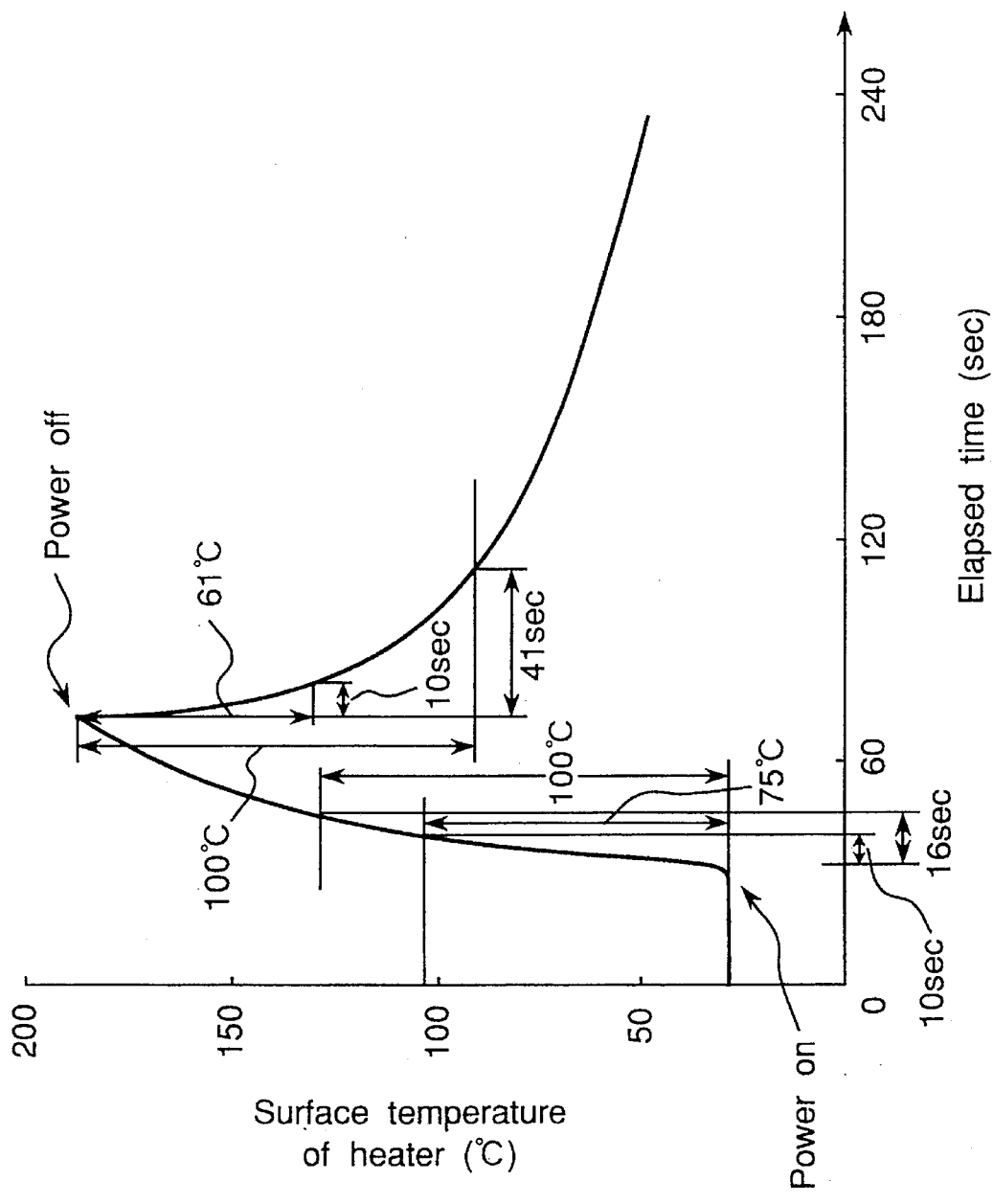
FIG. 4 is a chart showing the relationship between the heating elapsed time and the temperature rise of the electric heater when the object to be heated by the electric heater according to the present invention has a low thermal conductivity.

Next, FIGS. 3 and 4 show the results of the surface temperature change versus the heating elapsed time of the thin film electric heater according to the present invention.

FIG. 3 shows the surface temperature change of the thin film electric heater when a ceramic composed mainly of AlN was used for the base plate. Since the desired temperature rise rate was set to 7.5° C./sec, the unit area power requirement was 38.2 W/cm². Since the dimensions of the heated surface were L=4.4 cm and D=2.2 cm, with the setting of allowable voltage=30 V and allowable current=30 A, the range of the surface resistivity r of the thin film electric resistor can be determined from Equation (1) as 0.205 to 1.217 Ω/□.

Subsequently, a thin film electric resistor with surface resistivity r=0.541 Ω/□ was formed and when a voltage of 20 V was applied, the resulting current was 18.5 A. Therefore, the input power was 370 W, and the input power per unit area was 38.2 W/cm². FIG. 3 shows the temperature change of the electric heater with this input power.

As can be seen from FIG. 3, after the power was turned on, the temperature rise was 75° C. in 10 sec and 100° C. in 20 sec. That is, by using a surface resistivity r within the range defined by Equation (1), the desired temperature rise rate 7.5° C./sec was obtained within the ranges of allowable voltage and allowable current.

Figure 9:
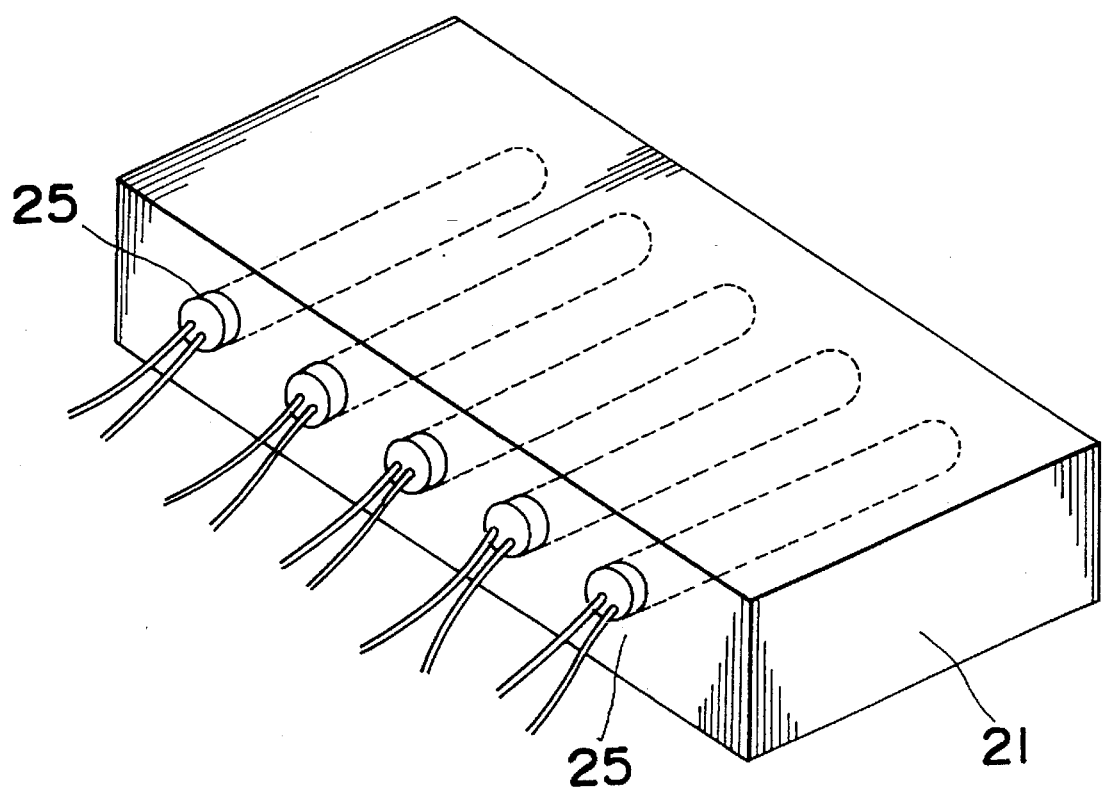
FIG. 9 is a perspective view showing a conventional bar-type electric heater used for heating the surface of an object.
Figure 10:
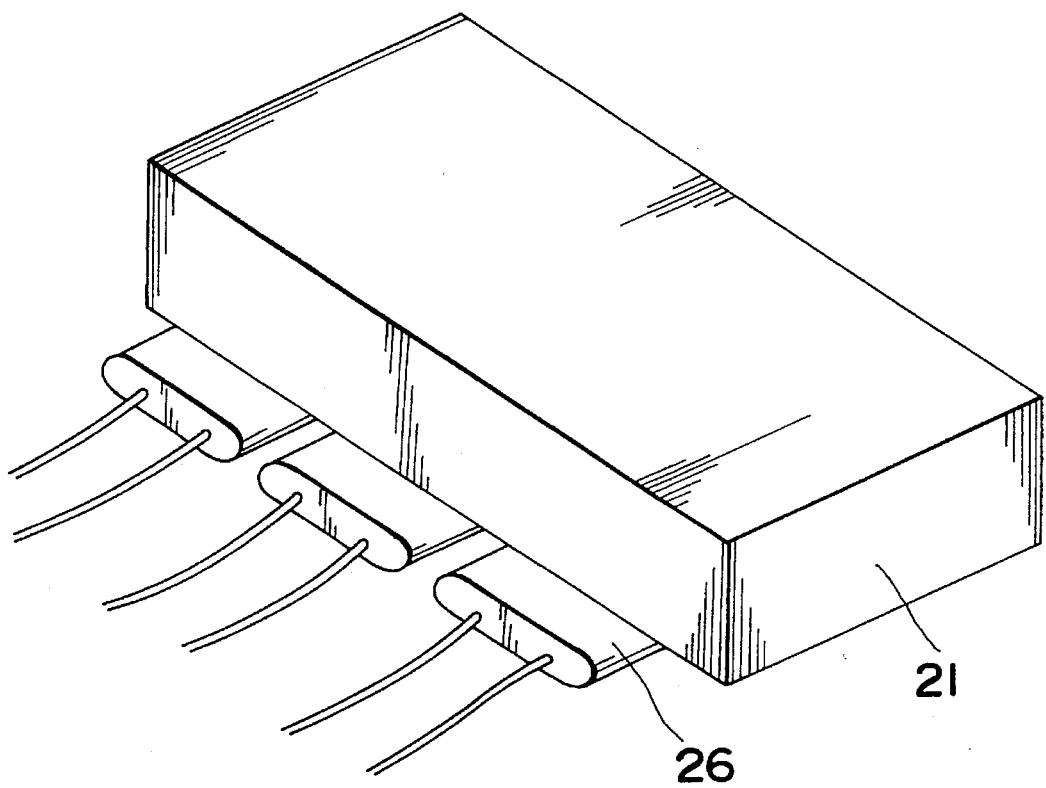
FIG. 10 is a perspective view showing a conventional flat-type electric heater used for heating the surface of an object.

Furthermore, after the power was turned off, the temperature fall was 75° C. in 10 sec and 100° C. in 23 sec. The conventional heating method as shown in FIG. 9 would require at least several minutes to several tens of minutes to obtain a temperature rise or temperature fall of 100° C. Compared with this, the present invention offers a much faster temperature rise.

FIG. 4 shows the surface temperature change of the thin film electric heater when a ceramic composed mainly of zirconia was used for the base plate. Being different from the case of AlN, where the unit area power requirement is 38.2 W/cm² to obtain the temperature rise rate of 7.5° C./sec, however for the case of zirconia with lower thermal conductivity, a unit area power requirement of 11.3 W/cm² is experimentally determined to obtain the same desired temperature rise rate of 7.5° C./sec. Since the dimensions of the heated surface were L=5.0 cm and D=2.5 cm, with the setting of allowable voltage=10 V and allowable current=20 A, the range of the surface resistivity r of the thin film electric resistor can be determined based on Equation (1) as 0.177 to 0.354 Ω/□.

Subsequently, a thin film electric resistor with surface resistivity r=0.228 Ω/□ was formed and a voltage of 8 V was applied, and then the resulting current was 17.6 A. Therefore, the input power was 140.8 W, and the input power per unit area was 11.3 W/cm². Shown in FIG. 4 is the surface temperature change of the thin film electric heater with this input power.

As can be seen from FIG. 4, after the power was turned on, the temperature changed 75° C. in 10 sec and 100° C. in 16 sec. That is, by using a surface resistivity r determined based on Equation (1), the desired temperature rise rate 7.5° C./sec was obtained within the ranges of allowable voltage $V_a$ and allowable current $I_a$.

Furthermore, after the power was turned off, the temperature changed 61° C. in 10 sec and 100° C. in 41 sec.

In comparison with the conventional heating method in which the temperature distribution is not uniform on the surface of the object, the uniform surface temperature of the heated object can be obtained by forming the thin film electric heater on the whole surface of the object directly.

Next described are a mold of plastics injection molding and the method for plastics injection molding according to the present invention, with which the thin film electric heater according to the present invention is employed.

Figure 5:
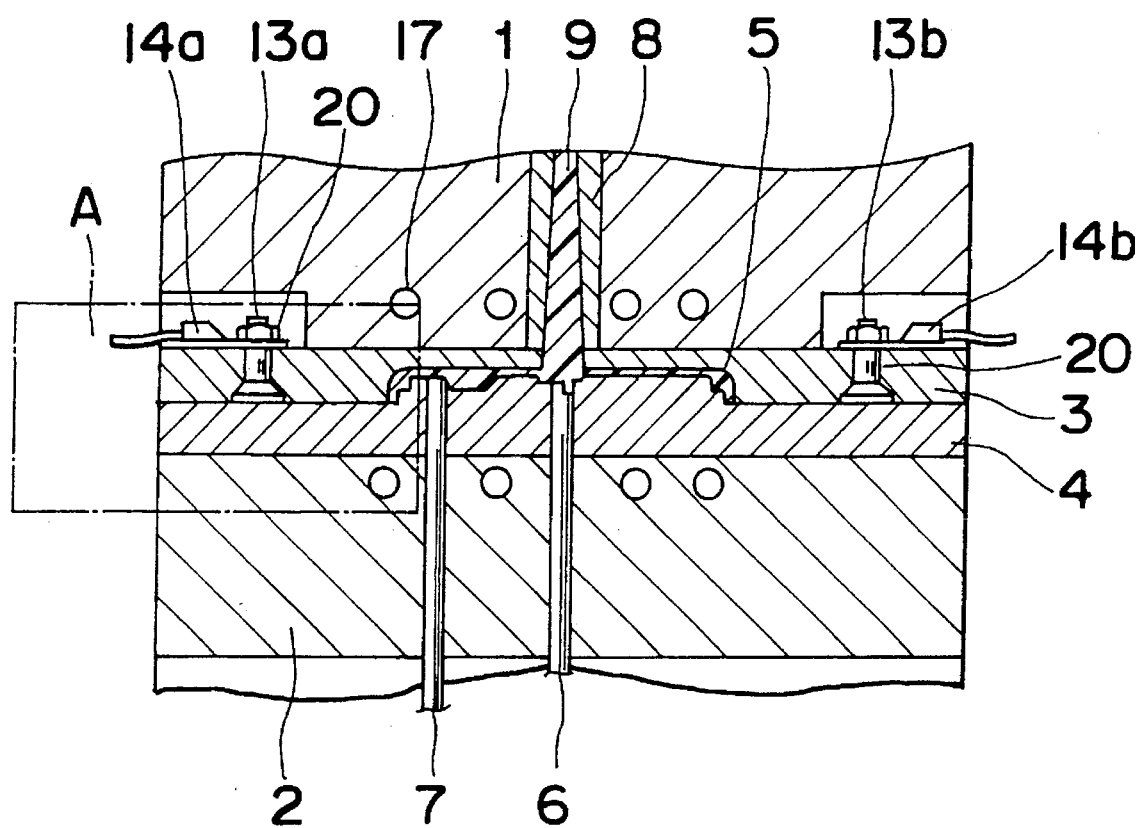
FIG. 5 is a partial sectional view of a mold for plastics injection molding using the thin film electric heater according to the present invention.
Figure 6:
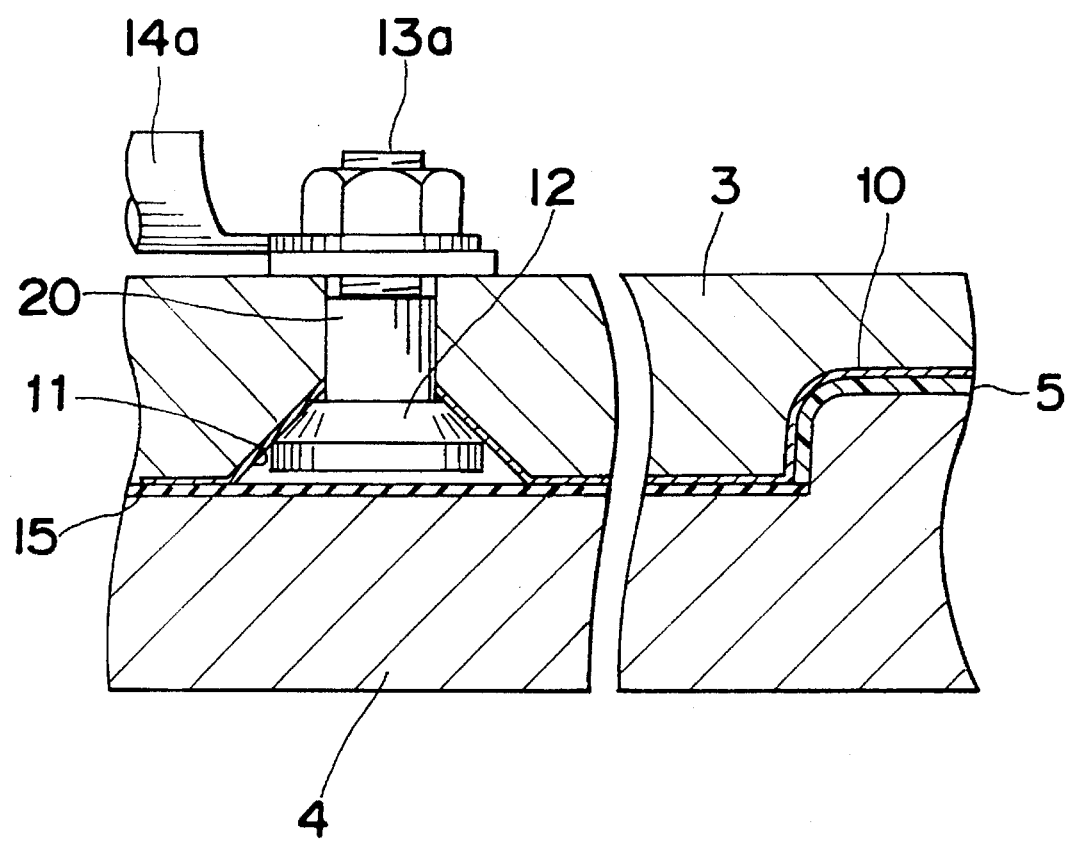
FIG. 6 is an enlarged partial sectional view of portion A in FIG. 5.

FIG. 5 is a sectional view of an embodiment of a rapid heating mold to which the thin film electric heater according to the present invention is applied. FIG. 6 is a detailed partial sectional view of portion A encircled by dot dash lines in FIG. 5.

In such figures are shown a stationary mold 1, a movable mold 2, a stationary mold insert 3 mounted to the stationary mold 1, and a movable mold insert 4 mounted to the movable mold 2. When the movable mold 2, which moves back and forth relative to the stationary mold 1, is closed against the stationary mold 1 as shown in FIG. 5, a cavity 5 is formed. Via sprue 8 molten plastics 9 is injected from an injection nozzle (not shown) of a injection molding machine into the cavity 5. A lock pin is denoted by numeral 6 and an ejector pin is denoted by 7. In the present embodiment, the stationary mold insert 3 is made of an electrically insulating ceramic. As shown in FIG. 6, a thin film electric resistor 10 is formed on the surface of the cavity 5 of the stationary mold insert 3, as well as on the extended surface thereof. The thin film electric resistor 10 is formed by the plasma CVD process, but it may also be formed by sputtering, ion plating, plating, or other processes.

The thin film electric resistor 10 is connected to a connecting bolt 13a having a conical step portion 12 in a conical recess 11 provided in an extension surface of the wall surface of the cavity. The connecting bolt 13a is further connected to a power source (not shown) via a terminal 14a. A connecting portion 20 is formed by the step portion 12, the connecting bolt 13a, and the terminal 14a. Since the movable mold insert 4 is made of a steel material, an insulating film 15 is provided on the surface of the movable mold insert 4 to prevent the direct contact with the thin film electric resistor 10, so that the thin film electric resistor 10 and the movable mold insert 4 are electrically insulated from each other. In this arrangement, if a voltage is supplied between the terminal 14a and the terminal 14b, the thin film electric resistor 10 generates heat. The thin film electric resistor 10, which is formed on the wall surface of the cavity 5, contacts with the molten plastics 9 so as to heat the molten plastics 9 directly. Thus, a high temperature rise rate can be attained efficiently by employing the thin film electric heater 10 according to this invention.

Figure 7:
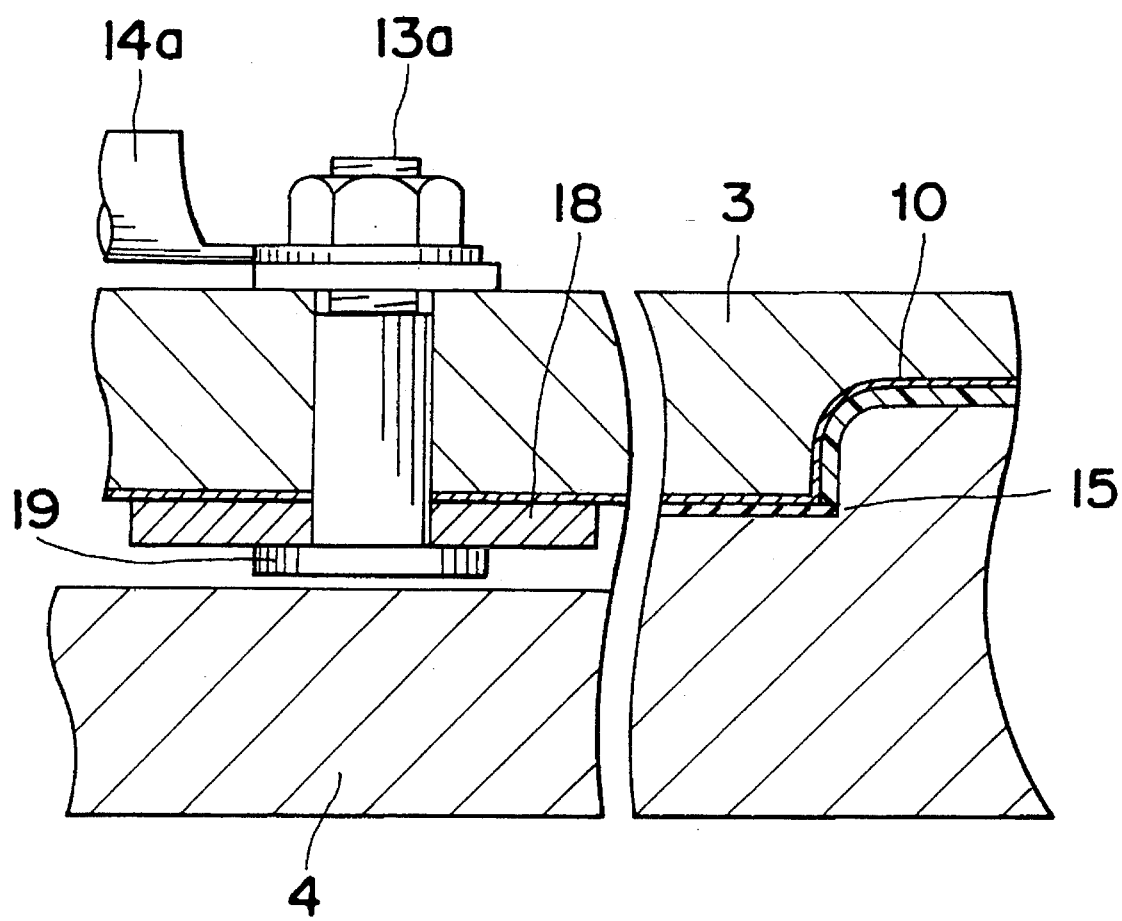
FIG. 7 is an enlarged partial sectional view of another embodiment corresponding to portion A in FIG. 5.

FIG. 7 illustrates another embodiment of the connecting portion 20 shown in FIG. 6. Referring to FIG. 7, a flat portion of a copper plate 18 is brought into contact with the extension surface of the thin film electric resistor 10 extended from the wall surface of the cavity, and the connecting bolt 13a having a disc-shaped step portion 19 fastens the copper plate 18 to the thin film electric resistor 10 tightly. As in the foregoing case, a connecting portion 20 is formed by the copper plate 18, electrically connecting bolt 13a, and an electrical terminal 14a. Such an arrangement makes it possible to reduce the contact resistance of the electrically connecting portion.

Next discussed are results of product quality improvement of molded products produced by the plastics injection molding method to which the thin film electric heater according to the present invention is applied.

As described above, a thin film electric heater made of TiN film was formed on the wall surface portion of the stationary mold insert 3 shown in FIG. 5.

Figure 8:
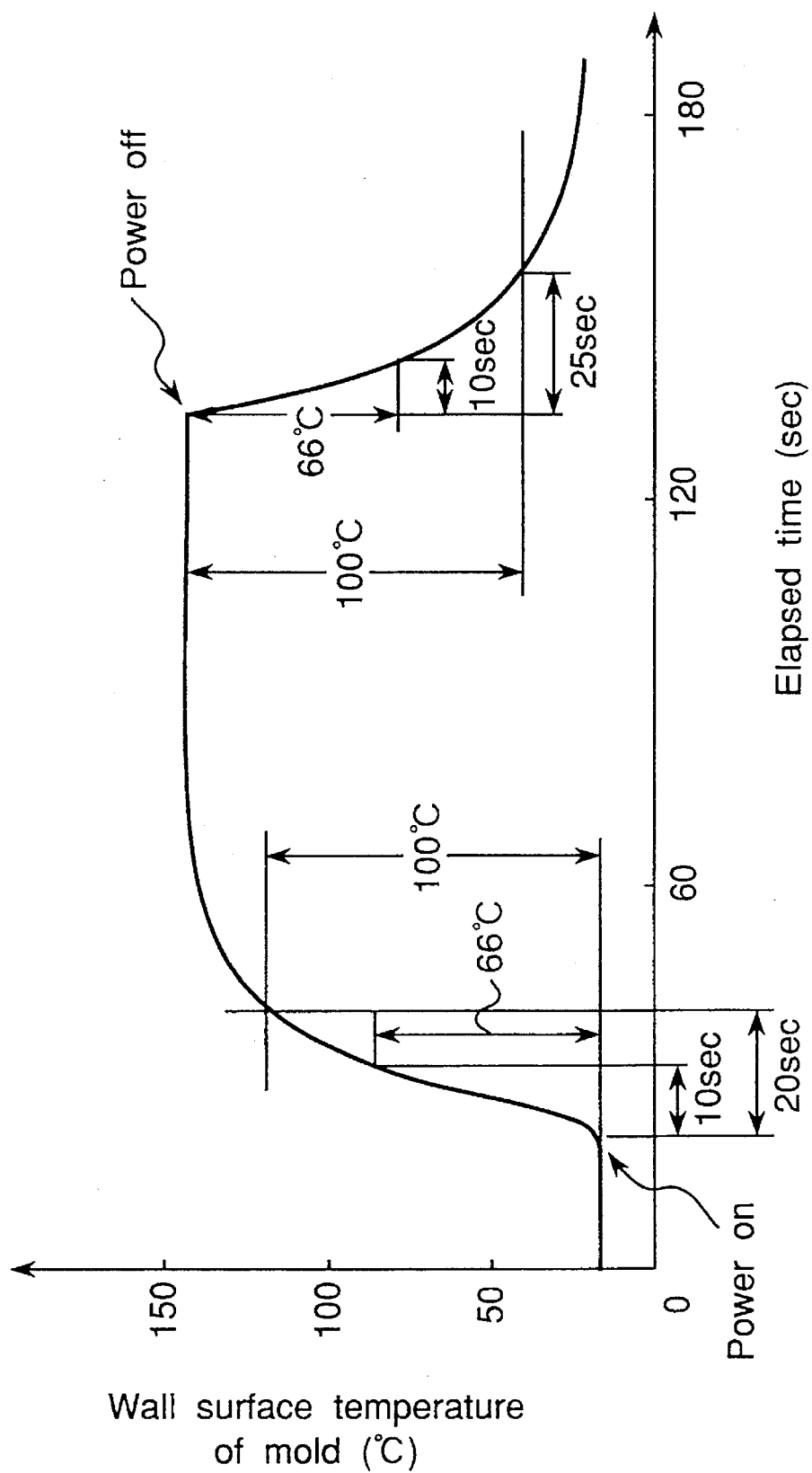
FIG. 8 is a chart showing the relationship between the elapsed time and the temperature of a wall surface of the mold when heating is effected in a mold for plastics injection molding using the thin film electric heater according to the present invention.

FIG. 8 shows a surface temperature change of the mold using the thin film electric heater. In this case, a ceramic composed mainly of AlN was used as the material of the base plate. Under the conditions of the surface resistivity of the thin film electric resistor r=0.45 Ω/□, L=17 cm, D=8 cm, and allowable voltage $V_a$=70 V, an input power of $W_r$=32 W/cm² was supplied. In this molding experiment, the thin film electric resistor 10 was formed by the plasma CVD process, but it may also be formed by sputtering, ion plating, plating, or other processes.

As shown in FIG. 8, after the power was turned on, the temperature rose 66° C. in 10 sec, and 100° C. in 20 sec. Furthermore, after the power was turned off, the temperature fell 66° C. in 10 sec, and 100° C. in 25 sec. As described before, the conventional heating method shown in FIG. 9 would take at least several minutes to several tens of minutes to attain a temperature rise or temperature fall of 100° C. In comparison to this, the present embodiment showed a much faster temperature rise.

In addition, ABS resin ("Stylac 100" produced by ASAHI CHEMICAL INDUSTRY) was used as the plastics in this molding experiment.

Table 1 below shows the relationship between the wall surface temperature of the mold and the formation of "silver streak" or "weld-mark". In Table 1, "mold temperature" means the wall surface temperature of the mold. Also, a "silver streak frequency" of 5/10 means that "silver streaks" were found in 5 out of 10 pieces of molded products.

TABLE 1

| Mold temperature (°C.) | Weld-marks | Silver streak frequency |
|---|---|---|
| 60 | Found | 5/10 |
| 100 | Found | 3/10 |
| 110 | Found | 3/10 |
| 120 | Not found | 0/10 |
| 130 | Not found | 0/10 |
| 150 | Not found | 0/10 |
| 200 | Not found | 0/10 |

It is shown from Table 1 that the defects such as "silver streaks" and "weld-marks" can be remarkably decreased with the wall surface temperature of the mold above 120° C.

Figure 12:
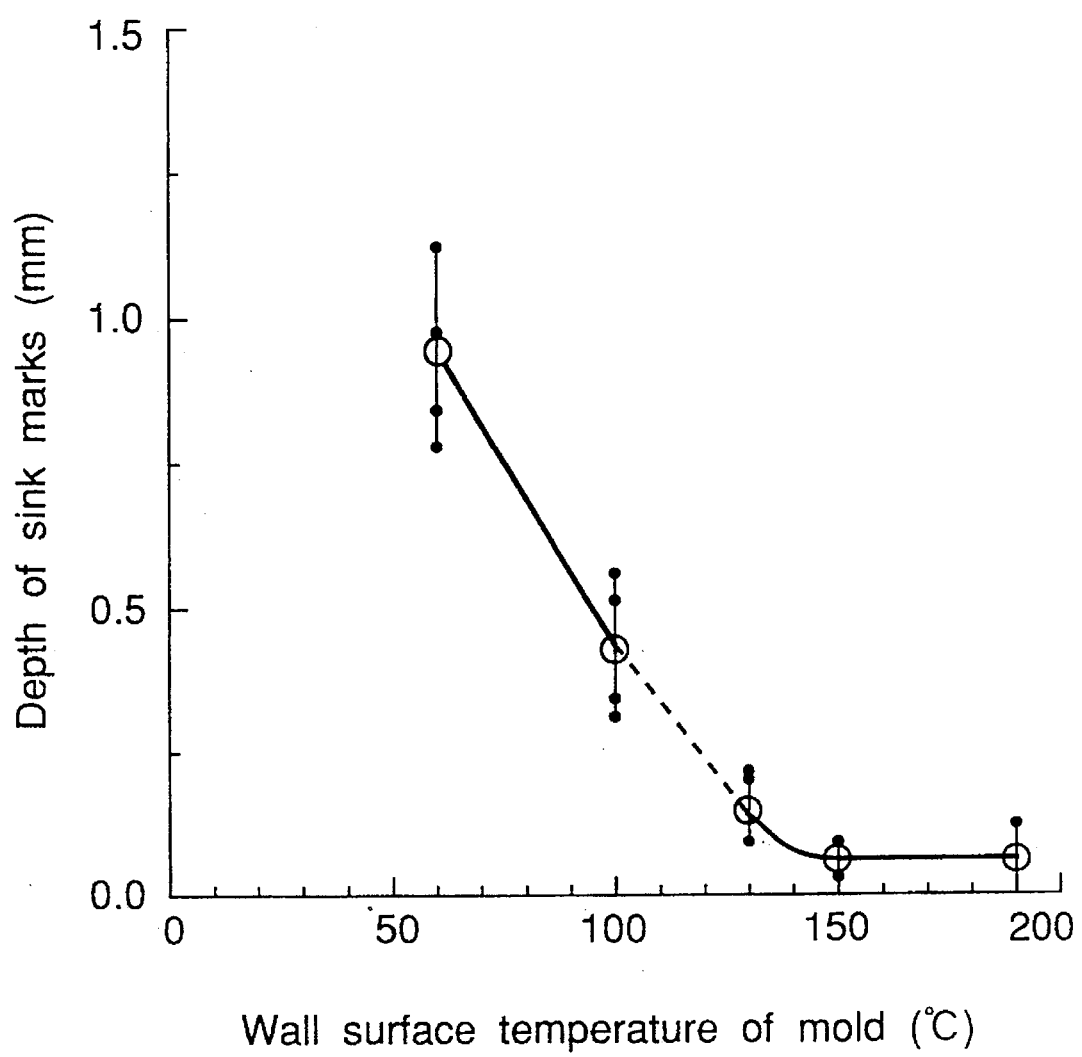
FIG. 12 is a chart showing the relationship between the depth of sink marks on the molded product surface and the temperature of the wall surface of the mold.

Next, the relationship between defects due to "sink marks" and the wall surface temperature of the mold is shown in FIG. 12. The "sink marks" mean small depressions on the surface of molded products, as described above, and the vertical axis in FIG. 12 shows the depth of such depression measured from the surface of the molded product. It can be seen from FIG. 12 that the depth of "sink marks" is dramatically improved with the wall surface temperature of the mold above 130° C.

Figure 13:
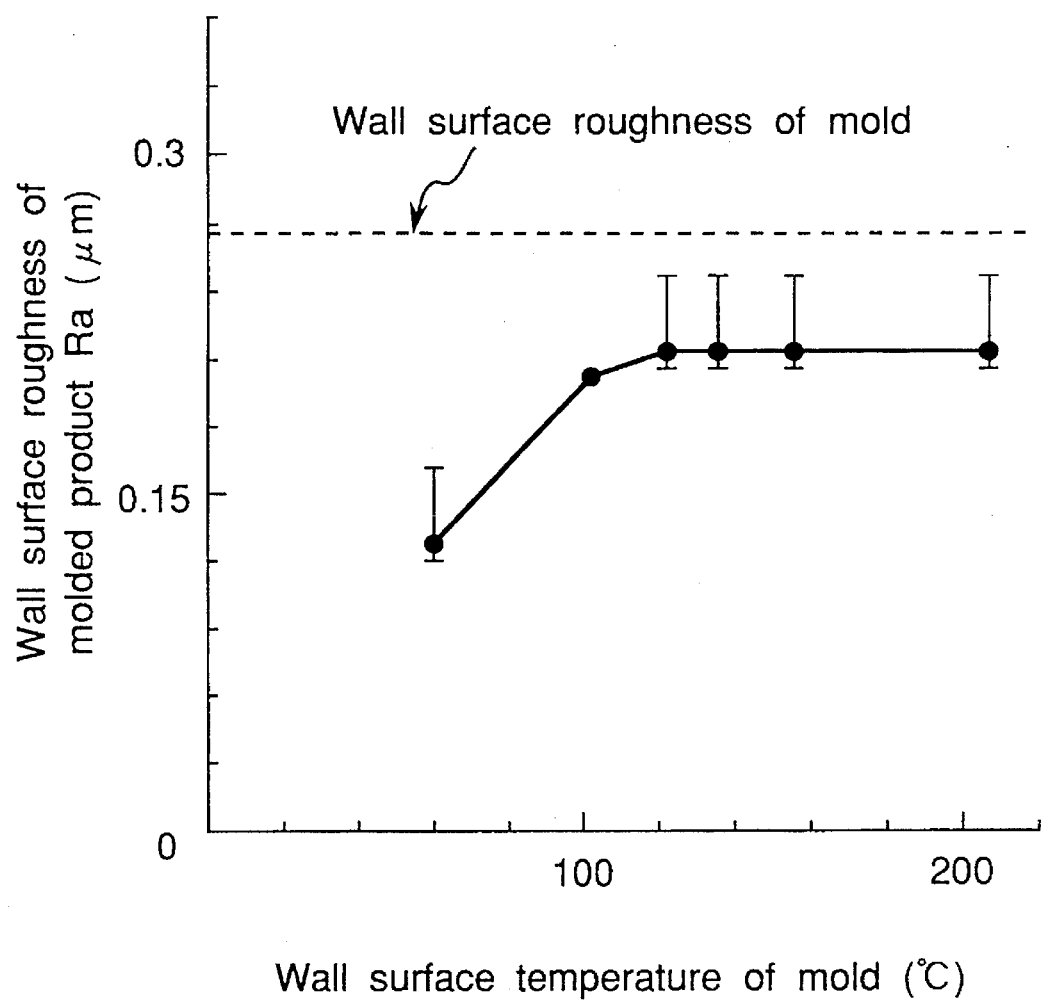
FIG. 13 is a chart showing the relationship between the surface roughness Ra of the molded product surface and the temperature of the wall surface of the mold.

Next, the relationship between the surface roughness $R_a$ of molded products and the wall surface temperature of the mold is shown in FIG. 13. From FIG. 13, it can be seen that the surface roughness $R_a$ of the molded product approached the surface roughness of the mold with the wall surface temperature of the mold over 100° C. That is, the fine rugged patterns of the wall surface of the mold are reproduced on the surface of the molded product more precisely when the wall surface temperature of the mold is over 100° C. As seen from this, the reproducibility of the molded products can be improved by heating the wall surface of the mold.

In the above described embodiments, the stationary mold insert 3 has been made of an electrically insulating ceramic, and the thin film electric resistor has been fabricated directly on its surface. However, it is also possible to make the stationary mold insert 3 by using a steel material, with an electrically insulating film formed thereon.

Further, in the embodiment as shown in FIG. 5, only the stationary mold has been provided with the thin film electric resistor so that rapid heating would be possible. Otherwise, the movable mold may also be provided with the thin film electric resistor so that the wall surfaces of both the stationary mold and the movable mold can be rapidly heated. The wall surface temperature of the stationary mold is preferably set to be different from that of the movable mold, and in other cases, is preferably set to be equal to that of the movable mold, depending on the shape and quality of the desired molded product. Thus, the molding condition can be selected from a more wide range by heating rapidly the wall surfaces of both the stationary mold and the movable mold.

As the material of the thin film electric resistor, in addition to TiN, one of the materials such as TiC, TiCN, TiAlN, CrN may be used to form the thin film electric resistor, or a plurality of these materials may be laminated.

Otherwise, a metal film having an appropriate surface resistivity may be adhered to the necessary portions of the cavity to serve as the thin film electric resistor.

As described above, according to the present invention, the heating action can be attained by the electric heater with the operating voltage and the operating current below values of allowable voltage $V_a$ and allowable current $I_a$.

Further, the surface temperature of the object to be heated can be rapidly increased by selecting the input power per unit area of the electric heater to be 10 to 60 W/cm² when the object to be heated is a high thermal conductivity material with thermal conductivity above 10 W/m·K, and by selecting the input power per unit area of the electric heater to 1 to be 15 W/cm² when the object is a low thermal conductivity material with thermal conductivity below 10 W/m·K.

Furthermore, by the method in which the thin film electric resistor is formed directly on the surface of the mold as shown in FIG. 5, and energized to effect heating, and by setting the electric resistance value of the thin film electric resistor to be within the range defined by Equation (1), the following advantages can be obtained.

The provision of a thin film electric heater formed on the wall surface of the cavity for heating the mold allows the rate of temperature rise or increase of the wall surface to increase rapidly so that the growth of a frozen layer on the surface of the molten plastics is suppressed, without prolonging the molding time. Moreover, after the electric power is switched off, the high rate of temperature fall or drop of the thin film electric resistor can be obtained so that the prolongation of the cooling time of the molten plastics is reduced to minimum.

Furthermore, by the molding method employing the thin film electric heater according to this invention, defects in the molded product such as "weld-mark", "silver streak", "sink mark" and the like, occur less frequently.

What is claimed is:

1. A mold for injection molding of plastic material, said mold having a mold cavity defined by a wall surface, and further comprising:

a thin film electric resistor formed directly on at least part of said wall surface;

said thin film electric resistor having terminals to supply thereto electric power to thereby heat said wall surface;

said thin film electric resistor having a surface resistivity r of a value defined by:

$$\frac{W_r}{\left(\frac{I_a}{D}\right)^2} \leq r \leq \frac{1}{W_r}\left(\frac{V_a}{L}\right)^2$$

wherein L is a length between said terminals as measured along said thin film electric resistor, D is length of said thin film electric resistor in a direction perpendicular to the direction between said terminals, $V_a$ is a maximum value of allowable voltage applied between said terminals, $I_a$ is a maximum value of allowable current flowing between said terminals, and $W_r$ is an input power per unit area of said thin film electric resistor determined to obtain a desired rate of increase of temperature of said wall surface.

2. A mold as claimed in claim 1, wherein said thin film electric resistor is formed of a material selected from a group consisting of TiN, TiC, TiCN, TiAlN and CrN and having a volume resistivity within a range of $10 \times 10^{-8}$ to $200 \times 10^{-8}$ $\Omega \cdot m$.

3. A mold as claimed in claim 1, wherein said mold is formed of a high thermal conductivity material with a thermal conductivity above 10 W/m·K, and said input power per unit area $W_r$ is 10 to 60 W/cm².

4. A mold as claimed in claim 1, wherein said mold is formed of a low thermal conductivity material with a thermal conductivity below 10 W/m·K, and said input power per unit area $W_r$ is 1 to 15 w/cm².

5. A mold as claimed in claim 1, wherein said surface resistivity r is from 0.05 to 1.0 $\Omega/\square$.

* * * * *